United States Patent [19]

Stocker

[11] 4,341,025
[45] Jul. 27, 1982

[54] POWER DRIVE FOR TREE TRANSPLANTING SPOONS

[76] Inventor: Walbert A. Stocker, 301 Sunset Dr., Jordan, Minn. 55352

[21] Appl. No.: 232,438

[22] Filed: Feb. 9, 1981

[51] Int. Cl.³ .............................................. A01G 23/06
[52] U.S. Cl. ...................................... 37/2 R; 144/2 N
[58] Field of Search .................. 37/2 R, 195; 144/2 N

[56] References Cited

U.S. PATENT DOCUMENTS

| | | | |
|---|---|---|---|
| 3,017,707 | 1/1962 | Sigler et al. | 37/2 P |
| 3,017,719 | 1/1962 | Sigler et al. | 37/2 R |
| 3,142,197 | 7/1964 | LeTourneau | 37/2 R |
| 3,364,601 | 1/1968 | Korenek | 37/2 |
| 3,460,277 | 8/1969 | Grover et al. | 37/2 |
| 3,558,177 | 1/1971 | Snead | 37/2 |
| 3,589,039 | 6/1971 | Korenek | 37/2 R |
| 3,618,234 | 11/1971 | Bates | 37/2 R |
| 3,713,234 | 1/1973 | Grover et al. | 37/2 R |
| 3,936,960 | 2/1976 | Clegg | 37/2 R |
| 3,958,613 | 5/1976 | Herz | 37/2 R |
| 4,031,637 | 6/1977 | Stocker | 37/2 R |
| 4,286,398 | 9/1981 | Lemond et al. | 37/2 R |

Primary Examiner—E. H. Eickholt
Attorney, Agent, or Firm—Kinney, Lange, Braddock, Westman & Fairbairn

[57] ABSTRACT

A power digging means for moving one of several digging spoons of a ring stand type tree digging machine into and out of the ground includes a pair of double acting hydraulic linear motors each connected at their end portions to a ring supported stanchion, a rack integral with the back of the spoon, a rack on the stanchion, a pinion support assembly connected to lower ends of each of the hydraulic motors, and a pinion meshed with the racks and rotatably mounted in the pinion support assembly. The pinion support assembly has arms extending past and behind the stanchion rack. A roller is rotatably mounted between the assembly arms and behind the rack to hold the stanchion rack in proper meshing relation to the pinion. The positioning of the stanchion rack and the spoon rack with respect to each other is adjustable to insure proper driving engagement of the pinion and racks and to insure a proper penetration path of the spoon into and out of the ground.

11 Claims, 11 Drawing Figures

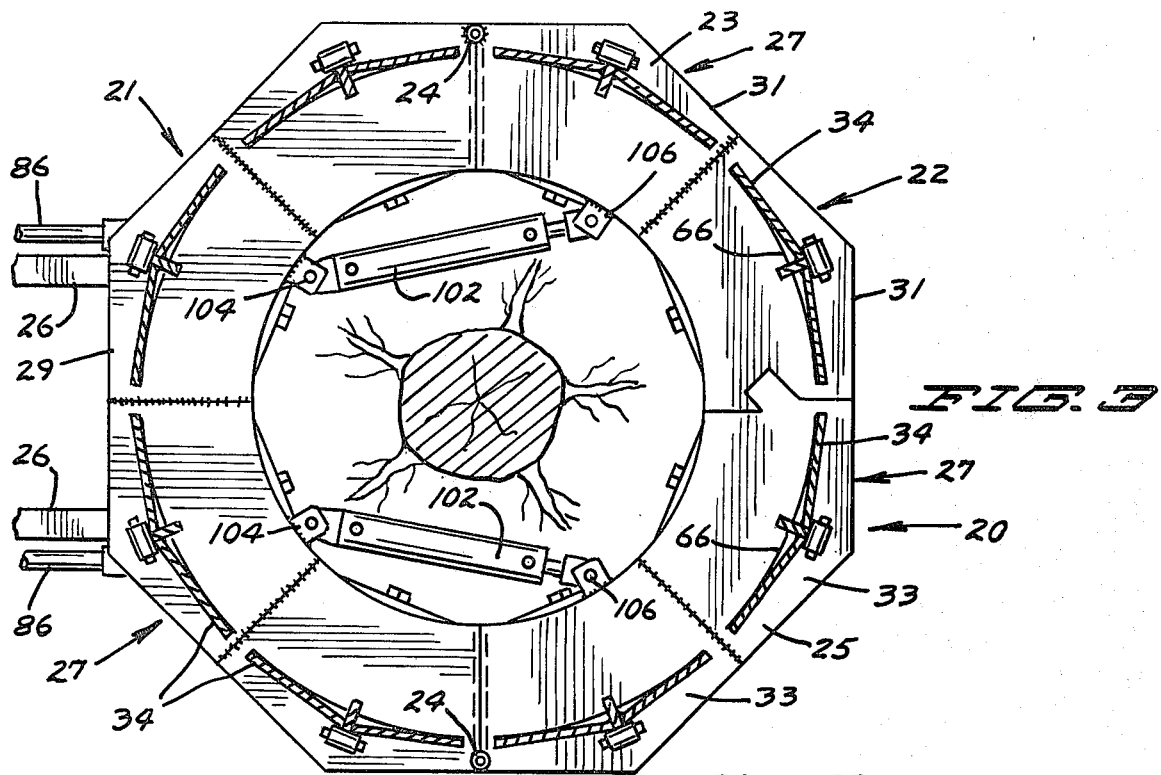
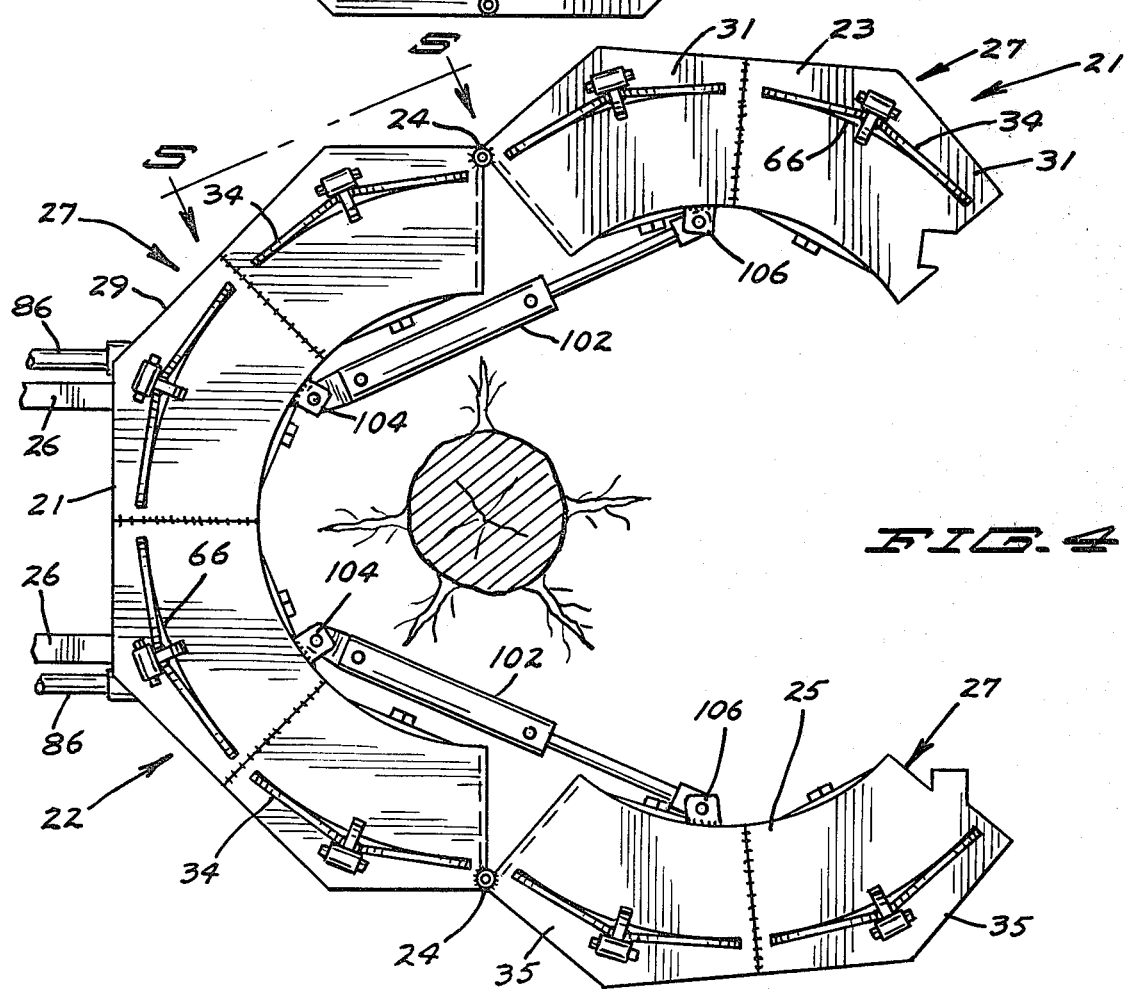

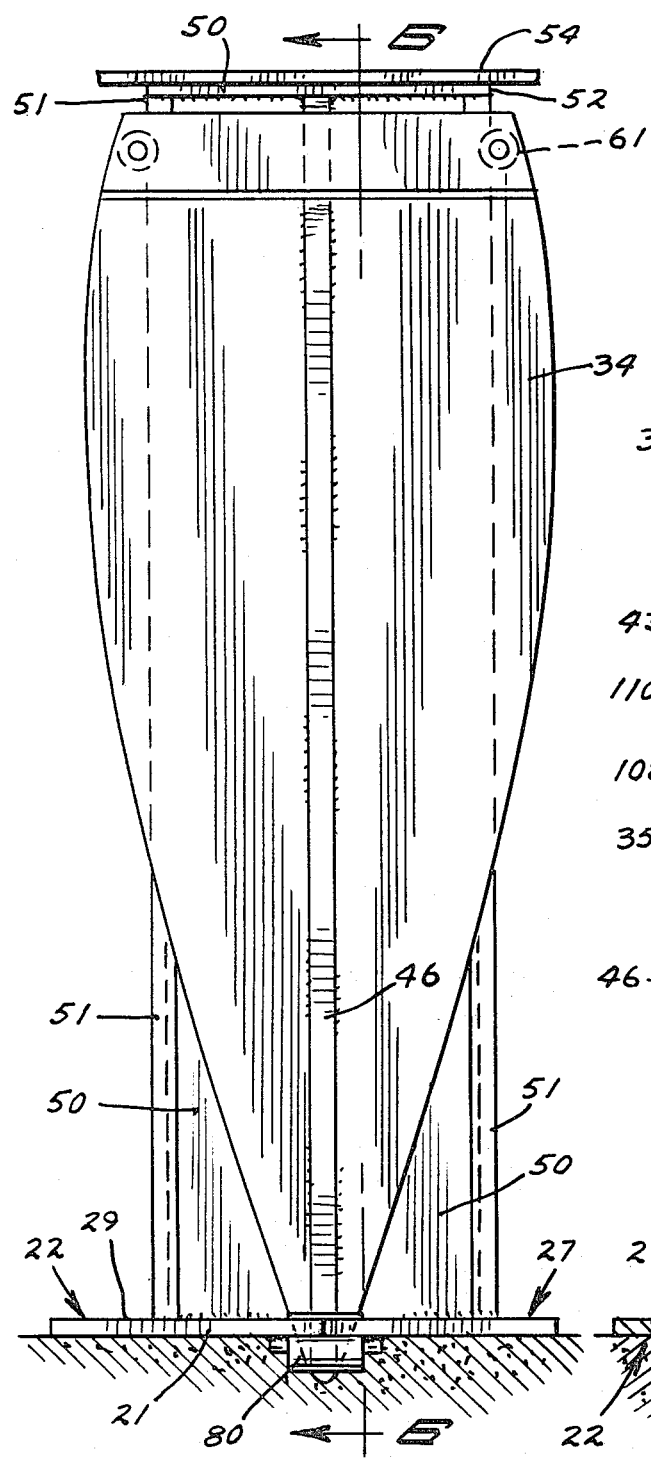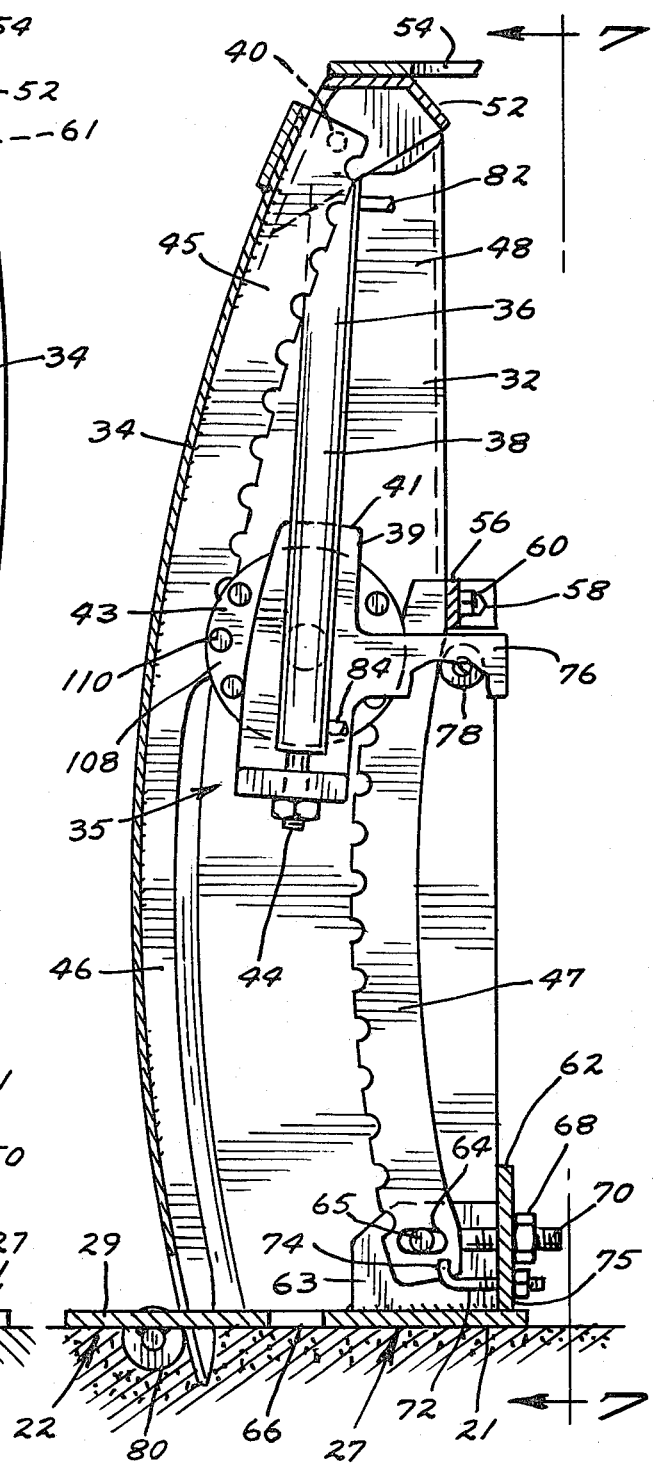

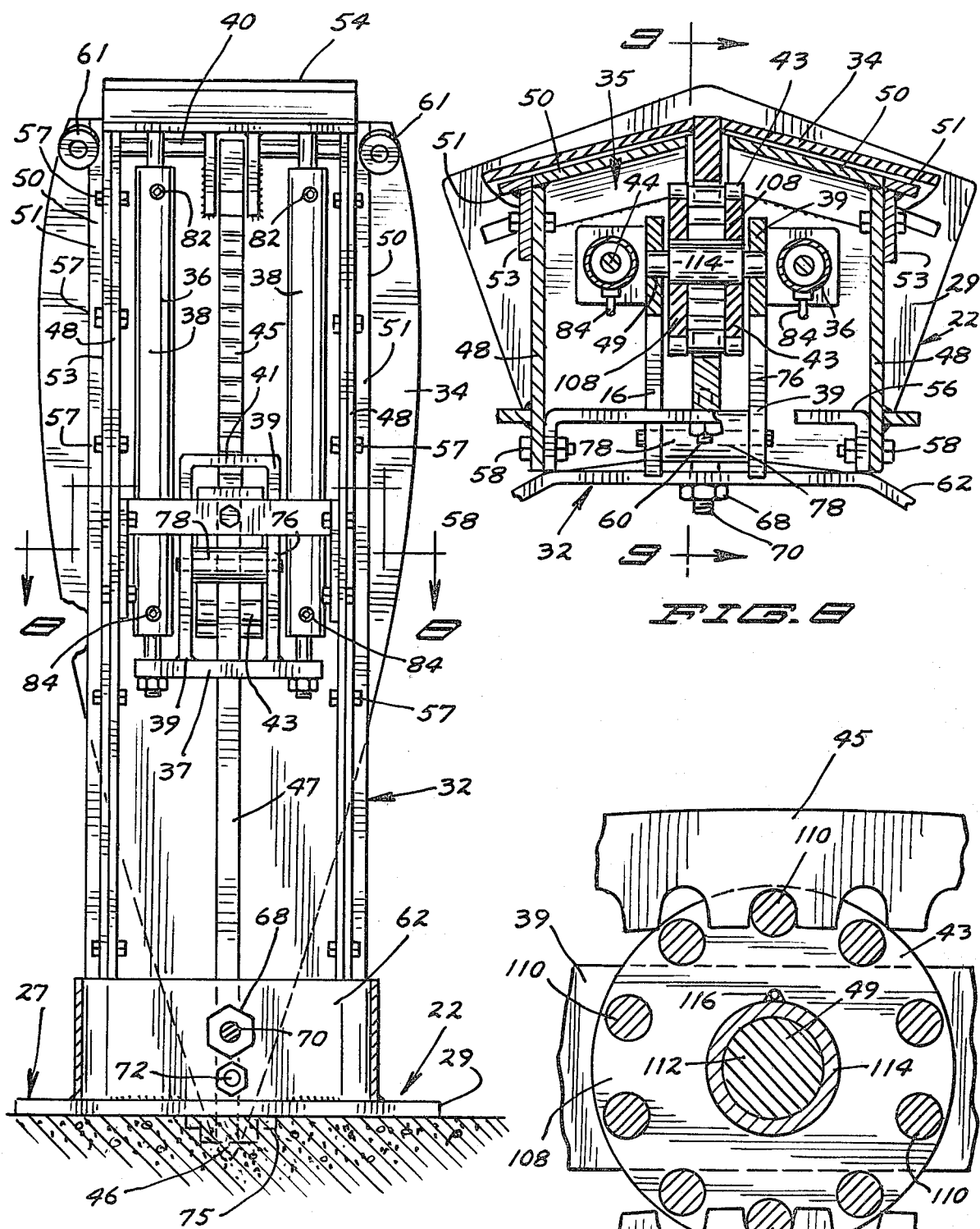
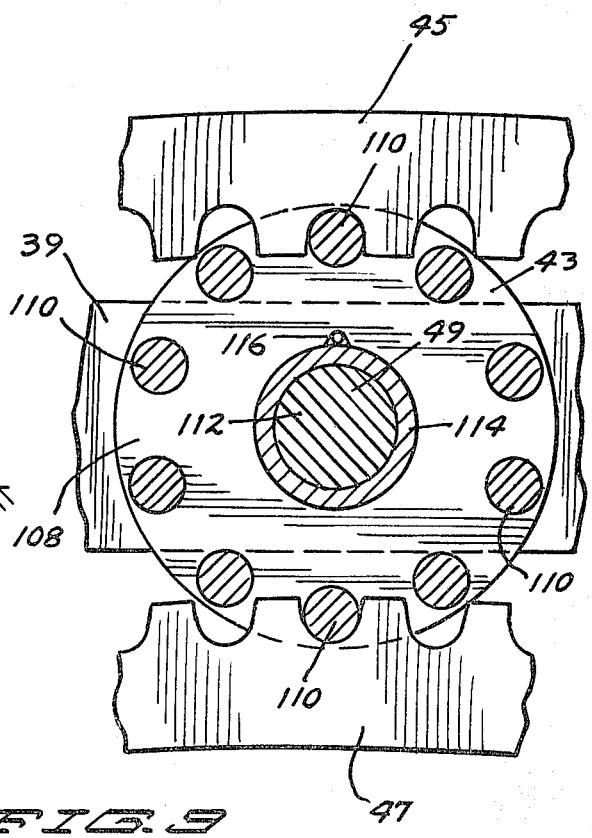

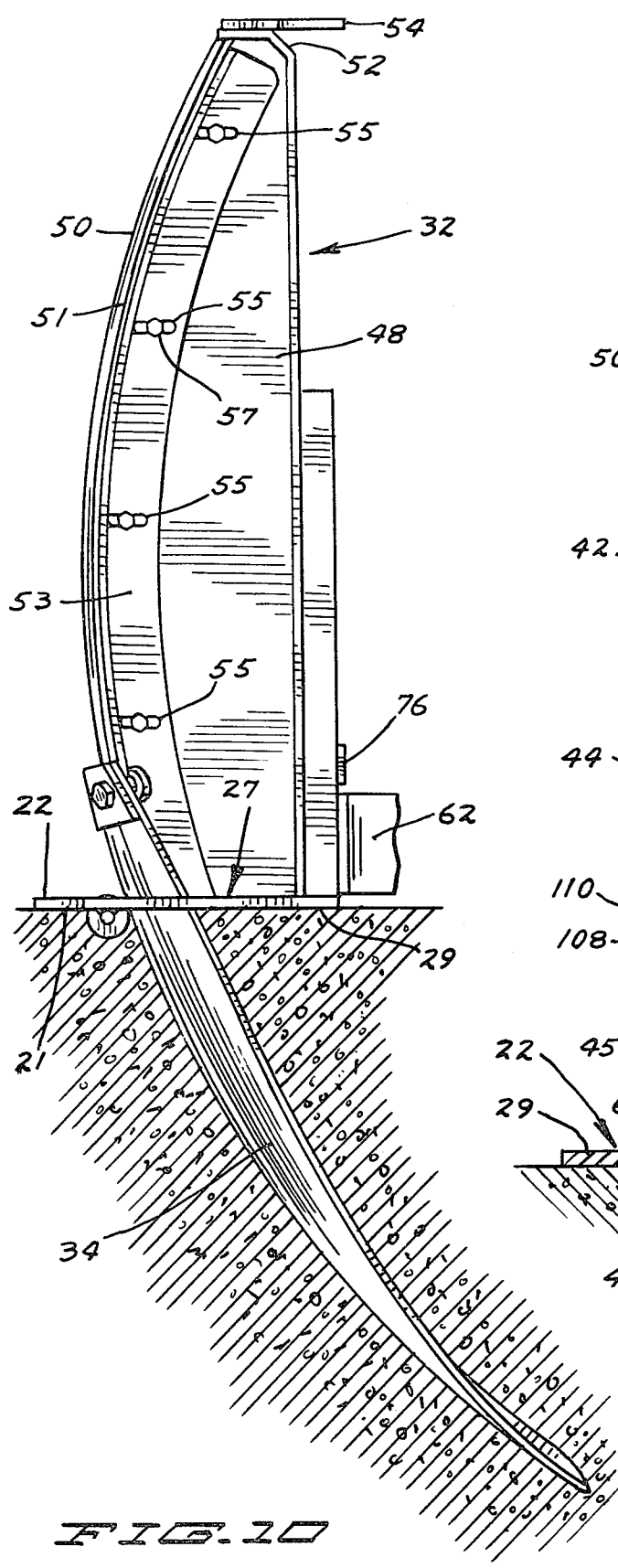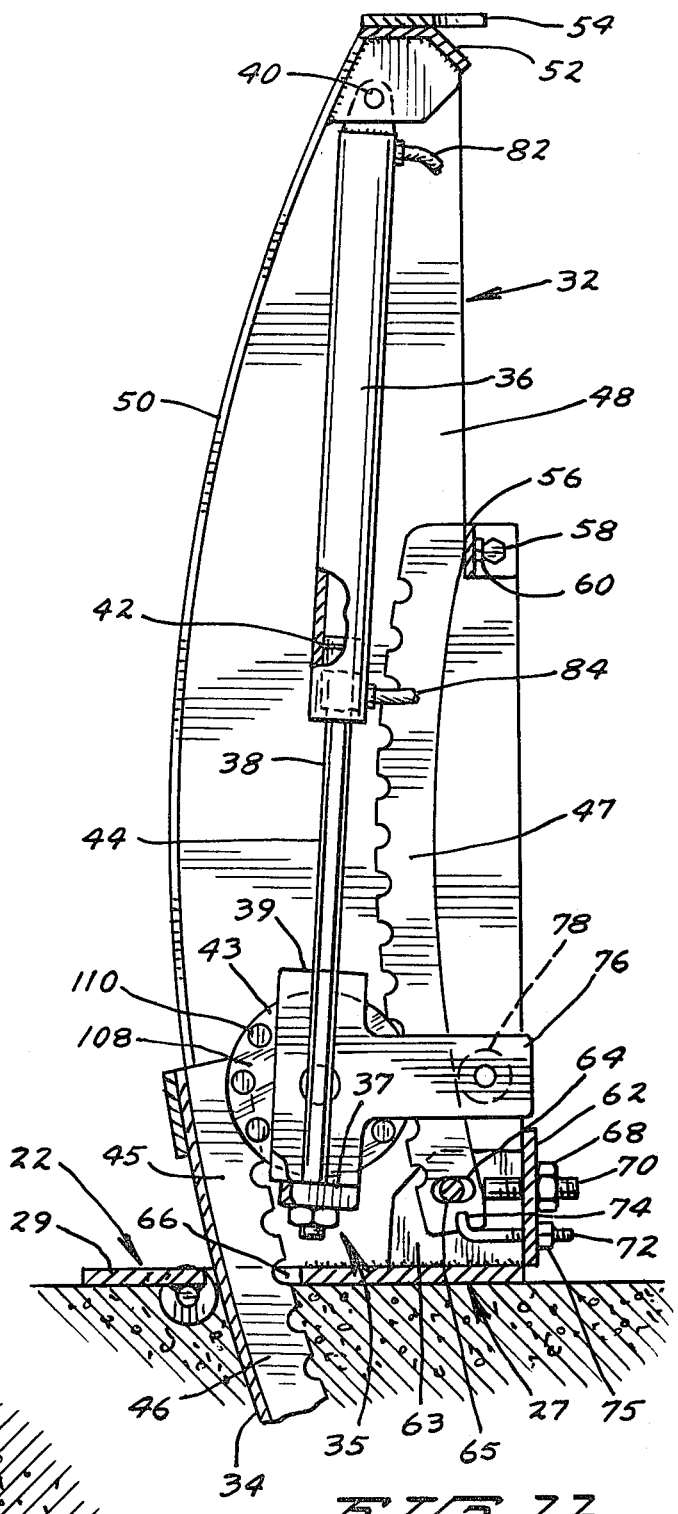

POWER DRIVE FOR TREE TRANSPLANTING SPOONS

BACKGROUND OF THE INVENTION

This invention has relation to tree transplanting machines wherein curved tree digging spoons are mounted in a ring around a tree to be transplanted and are forced and guided down into the ground to completely encompass the tree roots and to separate from the ground the tree roots and a tree ball encompassing those roots which can then be lifted out of the ground and transported to be transplanted in a provided opening at a new location. This is an improvement over my U.S. Pat. No. 4,031,637 for TREE TRANSPLANTING MACHINE granted to me on June 28, 1977, and the complete disclosure of that patent is incorporated herein by this reference to it.

In my patent, I disclosed a mechanism for driving each spoon into the ground. This mechanism included an upright curved stanchion having a rack in parallel spaced relationship to a rack on the upper half of a digging spoon, a pinion operably associated with both racks, and a hydraulic linear motor having its piston rod in driving relationship to the pinion. This provided twice the movement of the spoon into the earth for every unit of movement of the linear motor. This substantially reduced the overall height of the stanchion and motor assembly over the then prior art and allowed the machine to be used to transplant trees with major branches closer to the ground than was otherwise possible.

However, the linear motors still extended above the top of the digging spoons when the spoons were in their uppermost position. A structure whereby the stanchion and linear motor assembly did not extend appreciably above the uppermost position of the digging blades would have been more desirable.

In my patent, the path of the digging blade was guided and determined by a plurality of spaced-apart spoon rack bars 124 welded along a digging spoon rib 126, the rib 126 extending between spaced apart curved flanges 122,122 of the upright stanchion 32, and the rack bars sliding against these flanges 122,122. See FIGS. 7 and 11 of my patent. This metal to metal contact, in guiding the digging spoons into the ground was satisfactory, and my tree transplanting machine made according to this disclosure operated successfully for a number of years. However, there was necessarily a very substantial friction loss due to this metal to metal contact, requiring substantial additional force to be exerted than would otherwise be necessary in driving the spoons into the ground.

As perhaps best seen in FIG. 5 of my patent, the force exerted by the linear motor 38 on the pinion 43 was not in precise parallel alignment between digging spoon rack and the stanchion rack, and this component of force increased the friction between the metal to metal contact referred to above.

For many years, it has been known to force curved blades into the earth around a tree to be moved to isolate root structures and the surrounding earth into a roughly semi-circular tree root ball that can be lifted from the ground and moved to the desired new location and reinserted into a prepared hole in the ground.

In my patent specification, I called attention to patents to Wilkins, U.S. Pat. No. 594,668, granted in Nov. 1897; to U.S. Pat. No. 1,599,841, granted in Sept. 1926; to Wassell et al., U.S. Pat. No. 2,769,278, granted in November 1956; and to Crawford, U.S. Pat. No. 2,990,630, granted in July 1961. These patents were not close enough to be cited by the Examiner in the prosecution of my patent, and it is not believed that they are particularly pertinent to the inventions set out herein.

It is well known to use hydraulic piston-cylinder linear motors to drive digging blades into the ground and to pull them out again. See the patent to Bates, U.S. Pat. No. 3,618,234, granted in November 1971. In some structures of the prior art, in order to gain more power, a reverse ratio has been used whereby the movement of the blades into the ground is only one-half of that of the movement of the power means forcing the blades into the ground. See the patent to Sigler et al., U.S. Pat. No. 3,017,719, granted in January 1962. These patents were cited by the Examiner in the prosecution of my patent.

Other patents cited in my U.S. Pat. No. 4,031,637 include the following:
U.S. Pat. No. 3,017,709, Sigler et al., January, 1962;
U.S. Pat. No. 3,364,601, Korenek, January, 1968;
U.S. Pat. No. 3,460,277, Grover et al., August, 1969;
U.S. Pat. No. 3,558,177, Snead, January, 1971;
U.S. Pat. No. 3,589,039, Korenek, June, 1971;
U.S. Pat. No. 3,713,234, Grover et al., January, 1973;
U.S. Pat. No. 3,936,960, Clegg, February 1976;
U.S. Pat. No. 3,958,613, Herz, May, 1976;
German Pat. No. 23 53 828, granted in October 1973.

None of the above are believed to be as pertinent to the present invention as is my patent itself.

It is known to use a housing to pivotally support a pinion in spaced relation to a backup roller to insure that a rack between the pinion and roller stays firmly engaged with the pinion. See FIGS. 2 and 3 of U.S. Pat. No. 3,142,197 granted to Le Tourneau in July of 1964.

It has been proposed to force digging blades into the ground through the use of worm gears acting on nut assemblies fastened to top ends of such digging blades. See U.S. Pat. No. 4,226,033 to DeHaan, granted in October of 1980 on an application filed Jan. 1, 1979. As best seen in FIG. 5 of that patent, the driving worm gears or "upright lift screws 47" extend substantially above the tops of the guide units 41 and the uppermost position of the digging blades 42. In order to transplant trees having substantial branches lower than the top edges of lift screws 47, it will be necessary to cut off those branches.

Also, in the DeHaan patent, the outermost central edge portion of the digging blades 42 are said to be supported by guide rollers 63 rotatably supported in a mounting frame 64. It is stated that these guide rollers 63 are mounted on sliding bearings 65 "for adjustable movement laterally of blades 42 by adjusting screws 66." See FIG. 8 of DeHaan. At column 4, beginning on line 42, "as shown in FIG. 2, inward lateral movement of a [digging] blade 42 may be limited by the [metal to metal] engagement of the blade with the arcuate edges 44 of the guide unit legs 42." This metal to metal contact greatly increases friction and increases the designed maximum thrust capacity of the digging motors.

The upper end of each digging blade 42 of DeHaan is guided in downward direction by pairs of tracks 46,46 extending integrally inwardly from parallel, spaced-apart side legs 43,43 fixedly and integrally mounted as parts of each guide unit 41. Pairs of rollers 62,62 are rotatably mounted on each connecting member 58 which is integrally connected to a digging blade 42. The rollers 62,62 are confined between the adjacent parallel tracks 46,46 and so determine the downward path of the upper end of the digging blade 42.

This guide structure including bottom roller 63 and upper rollers 62,62 do not positively limit movement of digging blades 42 in direction at right angles to side legs 43,43 of each guide unit 41. Any slight movement of any of the blades 42 normal to their associated guide unit side legs 43,43 results in a misalignment and a mismatch of the lower ends of the blades when they reach the limit of their travel in downward direction, and the overlapping and gaps thus caused results in an unsatisfactory support for the tree ball while it is being lifted and transported.

The structure for guiding the digging blades 42 of DeHaan is such that the only adjustment of the blade path which can be made is in the positioning of the lower guide roller 63 through the use of adjusting screws 66,66 as shown in FIG. 8 of DeHaan. Any wear of the bushings or any warping or other distortion of the digging blades 42 and of the other parts necessitates a long and painful procedure to readjust each pair of adjusting screws 66. Even after that adjustment is made, the path through the earth will never be exactly the same inasmuch as the upper guide path remains fixed while the lower guide point (lower guide roller 63) has been moved. Thus less than a perfect fit of the blades at their lowermost position must necessarily result.

A further difficulty with the worm gear or "lift screw 47" is that it is necessarily open to contamination with dirt falling from the digging blades after a tree has been transplanted and the blades are raised from the ground. This increases the friction losses in the operation of the worm gears and results in an overall increase in the maximum available power necessary to operate the apparatus.

To develop a power drive for tree transplanting spoons which includes a guide path for those spoons which is readily adjustable along its entire length, which can be operated to force digging spoons into the earth without appreciable wasted frictional losses, and which includes structures not appreciably higher than the digging blades themselves at their uppermost position, the present invention was developed.

The inventor and those in privity with him know of no prior art closer than that identified and discussed herein, and know of no prior art which anticipates the claims herein made.

BRIEF SUMMARY OF THE INVENTION

A ring stand adapted to be supported on the ground in encircling relation to a tree to be transplanted is split and is mounted with respect to a vehicle so that it can be supported above the surface of the ground by the vehicle, moved to an open or split condition around a tree to be transplanted, closed and fastened to form a unitary ring, and supported on the surface of the ground in concentric relation to the tree to be transplanted.

A plurality of digging spoons are evenly positioned around the outer periphery of the ring stand and are guidably supported with respect to stanchions extending integrally upwardly from the ring stand.

On each stanchion, a pair of parallel, spaced-apart linear motors are provided to force a digging spoon downwardly into the earth. A rack is provided on the upper half of each digging spoon, and a parallel, spaced-apart cooperating rack is adjustably mounted with respect to the stanchion. The linear motors are pivotally mounted at their upper ends to a top portion of each stanchion, and bottom ends of both of the motors are mounted to a support brace. A pinion operably associated with both racks is rotatably mounted in a pinion support assembly which extends integrally and upwardly from the support brace. Horizontally extending arms of each side of the pinion support assembly pass on each side of the stanchion-supported rack and rotatably support a rack positioning roller which rolls against the back of the stanchion-supported rack to maintain the pinion in precise operating relationship with respect to that rack.

The pinion supported rack is fixedly mounted at an upper end thereof to the stanchion, while the bottom end of the rack is mounted for adjustment in direction toward and away from the digging spoon.

Curved digging spoon guide tracks extend outwardly from each side of the stanchion and are adjustably mounted with respect to the stanchion. Rotatably mounted upper digging spoon guide wheels are provided at upper ends of each digging spoon in spaced relation to the spoon and in position to run on the spoon guide tracks to exactly delineate the path of the upper end of the digging spoon as it moves in up and down directions.

The lower end of the digging spoon extends through a provided opening in the ring stand, and a force bearing roller is rotatably but permanently mounted to the ring stand to positively determine and limit the outward position of an outer central spine of the digging spoon as it moves in upward and downward direction.

IN THE DRAWINGS

FIG. 3 is an enlarged horizontal sectional view looking up from the bottom on the line 3—3 in FIG. 1;

FIG. 4 is also an enlarged horizontal sectional view looking up from the line 3—3 in FIG. 1 but showing the machine's digging spoons in a retracted position and its ring stand in an open position;

FIG. 5 is an enlarged, fragmentary, elevational view taken on the line 5—5 in FIG. 4;

FIG. 6 is a fragmentary vertical sectional view taken on the line 6—6 in FIG. 5;

FIG. 7 is a fragmentary elevational view taken on the line 7—7 in FIG. 6;

FIG. 8 is an enlarged, fragmentary, horizontal sectional view taken on the line 8—8 in FIG. 7;

FIG. 9 is an enlarged, fragmentary, vertical sectional view taken on the line 9—9 in FIG. 8;

FIG. 10 is an enlarged, fragmentary, vertical sectional view taken on the line 10—10 in FIG. 1; and FIG. 11 is an enlarged, fragmentary, vertical sectional view taken on the line 11—11 in FIG. 1.

DESCRIPTION OF PREFERRED EMBODIMENT

Figure 2:
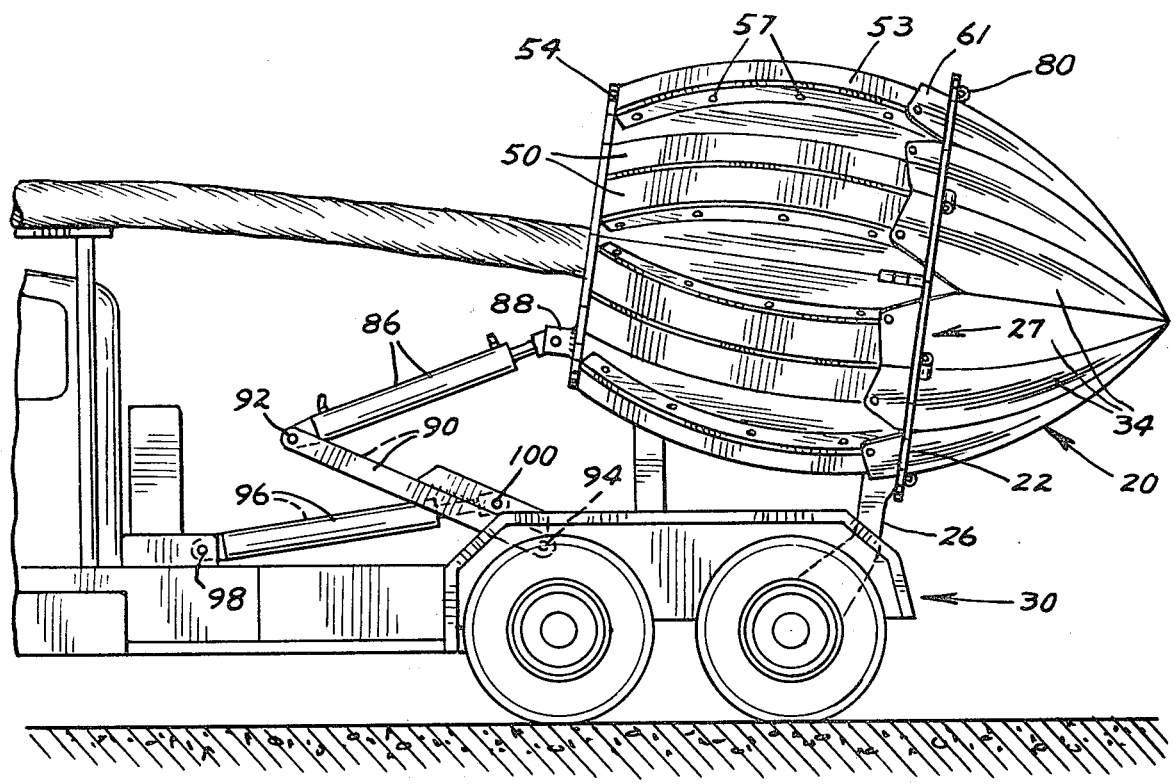
FIG. 2 is a side elevational view of the tree transplanting machine and a portion of the vehicle of FIG. 1 but illustrating the machine and the tree after the tree has been dug and is in position for transportation to its new location.
Figure 1:
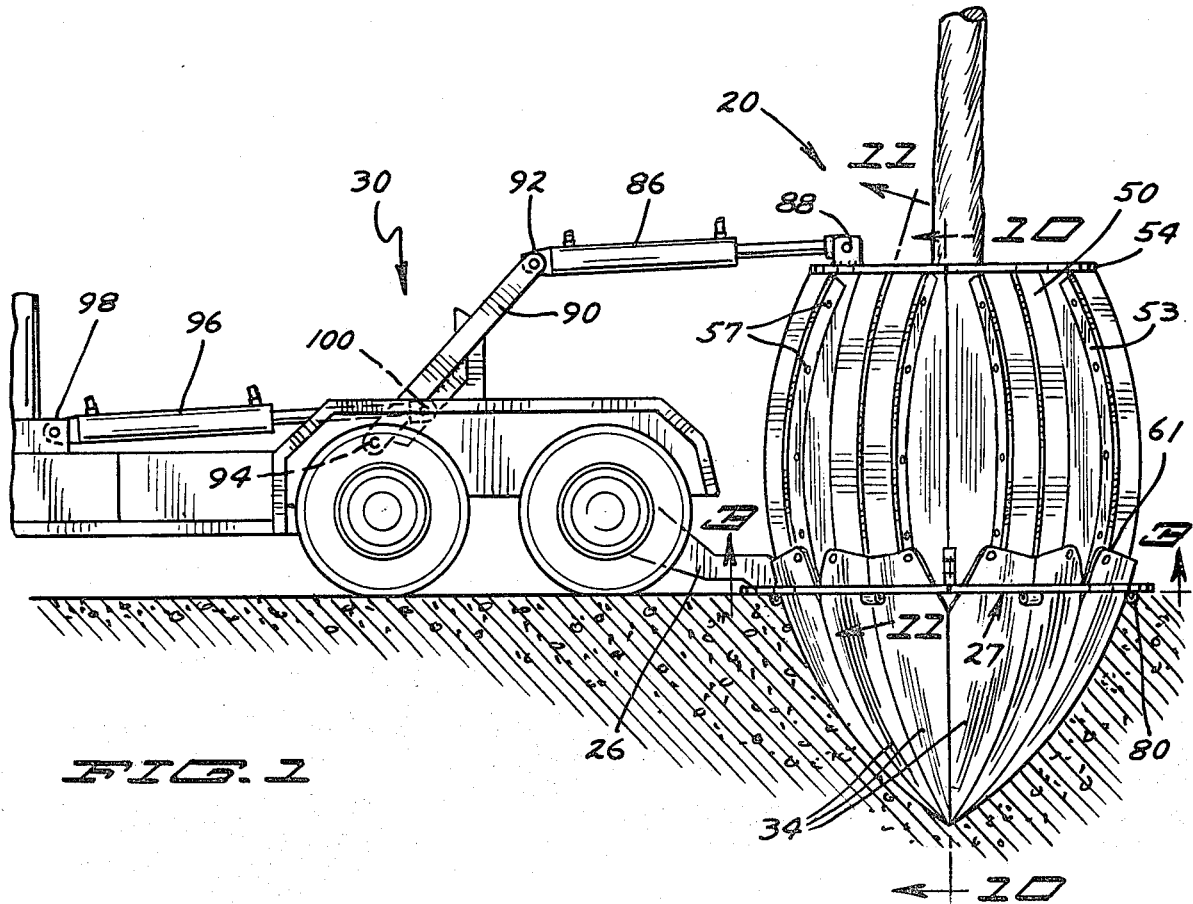
FIG. 1 is a side elevational view of a tree transplanting machine of the invention shown in its relationship to a tree to be transplanted after the digging operation and before the tree had been moved and showing its relationship to the rear of a vehicle for transporting it.

A tree transplanting machine 20 includes a ring stand 22 made up of a fixed half 21 and two openable quarters 23 and 25. The fixed portion of the ring stand is pivotally mounted with respect to the rear axle of a vehicle 30 by ring stand support arms 26,26.

Ring stand 22 includes a plurality of stanchion support plates 27 welded to each other. These support plates 27 include fixed plates 29 forming the fixed half 21 of the ring stand 22; and two pairs of pivoted plates 31,31 and 33,33, pivotally mounted as at 24 to the outermost ends of plates 29 and forming the openable quarter 23 and the openable quarter 25 respectively of the ring stand 22. Welded onto each of the stanchion support plates 27 is a hollow curved upstanding stanchion 32. Each of these stanchions supports a digging spoon 34 in a manner to be described. Eight stanchions are shown herein, but six, four or some other number will work satisfactorily.

Cylinders 36 of a pair of hydraulic linear piston-cylinder digging motors 38 are pivotally mounted adjacent their closed ends to upper portions of each stanchion 32 as at 40. A piston rod 44 of each such linear digging motor 38 is connected to a piston 42 thereof. Each pair of piston rods 44 is bolted to a digging spoon drive pinion support assembly 35. This assembly 35 includes a piston rod support brace 37 to which each of the piston rods 44,44 is bolted, a pair of parallel, spaced-apart drive pinion support plates 39,39 welded to and extending integrally upwardly from support brace 37, and a support plate spacer 41 integral with an upper end of each of the support plates 39. A digging spoon drive pinion 43 is rotatably mounted between each pair of drive pinion support plates 39,39 as at 49.

A digging spoon rack 45 is integral with and extends outwardly from the upper half of the inner surface of each digging spoon 34. The rack is an extension in direction away from the digging spoon of a vertical spine 46 which extends the entire length of the digging spoon 34 and adds strength to it. A stanchion rack 47 is adjustably mounted with respect to each stanchion 32 in a manner to be described. When the proper adjustments have been made, each stanchion rack 47 will be in precise, parallel, spaced-apart relationship with respect to its associated digging spoon rack 45. Each pinion 43 is located in meshing, operational relationship with respect to both its associated digging spoon rack and stanchion rack.

In the form of the invention shown, each stanchion is substantially identical with every other stanchion except that some of them have appendages by which they are fastened with respect to other parts of the machine or which support linear motors which move various elements of the machine 20 with respect to other elements and/or with respect to the vehicle 30. Therefore, a detailed description of only one of the stanchions is necessary and provided.

Each stanchion includes a pair of parallel, spaced-apart, vertically upright stanchion side plates 48,48 integral with, welded to, and extending upwardly from its associated stanchion support plate 27. Both of such side plates are curved to accommodate the shape of the digging spoon with which they are associated. Each set of mutually parallel stanchion side plates 48,48 is tied together with a cap plate 52. A segment of an upper horizontal ring 54 ties the cap plates 52 of the fixed half of the stanchions to each other and other segments of ring 54 tie together the stanchions of each openable quarter. The upper horizontal ring 54 is provided with pivot points at appropriate places (not specifically shown) to allow the stanchions associated with the openable quarter 23 and the openable quarter 25 of the ring stand 22 to pivot with respect to the fixed half 21 of the ring stand 22.

Each of a pair of curved, substantially vertical outer stanchion face plates 50,50 is integral with the curved outer edge of one of the side plates 48,48 of each set and with the associated stanchion support plate 27. Each face plate 50 extends toward the other in the same plane as the other; but the two are separated from each other sufficiently to provide a gap through which digging spoon rack 45 of the associated digging spoon 34 can extend.

A pair of digging spoon guide tracks 51,51 are curved similarly to face plates 50 and the edges of stanchion side plates 48,48, also to accommodate the shape of the digging spoon with which they are associated. Each such digging spoon guide track is provided with a guide track positioning flange 53 which extends away from the guide track in normal relationship to it and is designed to be fastened against an outer surface of one of the stanchion side plates 48. To fasten each guide track positioning flange with respect to one of the stanchion side plates, a plurality of horizontal slots 55 (four as shown in FIG. 10) are provided in each positioning flange 53, and guide track positioning bolts 57 extend through each of these slots to be threadably mounted in each stanchion side plate 48.

In the form of the invention shown, each upper outer corner edge portion of each of the digging spoons 34 is provided with a rotatably mounted upper digging spoon guide wheel 61, each such guide wheel being situated in spaced relationship to the digging spoon sufficiently to trap the digging spoon guide track 51 between it and the spoon, thus to precisely predetermine the pathway of the upper portion of the spoon with respect to the stanchion 32 as it moves up and down with respect to that stanchion.

As perhaps best seen in FIG. 11, but also as seen in FIGS. 3 and 4, a slot-like opening 66 is provided in each stanchion support plate 27 to allow passage of intermediate portions of the digging spoon 34 therethrough. A digging spoon force bearing roller 80 is rotatably mounted to the support plate 27 at the apex of the opening 66 in position to be in contact with the outer surface of the spoon 34 in alignment with its vertical spine 46 to withstand the outward forces on the digging spoon both during the digging process and during the lifting process when the weight of the tree and the tree ball are being supported on the digging spoons. This roller acts at the same time to reduce substantially the friction losses which would be occasioned should the digging spoon bear directly against its stanchion support plate 27 at that point.

It is to be understood that with the digging spoon force bearing roller 80 positively determining the positioning of the portion of the digging spoon 34 in contact with it, and with the ability to adjustably position the digging spoon guide tracks 51 with respect to the vertically upright stanchion side plates 48,48, the precise and exact path of digging spoon 34 and of the digging spoon rack 45 can be accurately predetermined.

An upper stanchion rack support bracket 56 is bolted between each pair of stanchion side plates 48,48 as at 58; and an upper end of stanchion rack 47 is bolted to this support bracket as at 60.

An inner ring stand support skirt 62 is integral with and extends upwardly from each stanchion support plate 27 of the fixed half 21 of the ring stand 22 from each stanchion support plate 27 of the openable quarter 23 and from each stanchion support plate 27 of the openable quarter 25 of the ring stand. A pair of lower stanchion rack anchor plates 63,63 are welded to the upper surface of each stanchion support plate 27 and to the ring stand support skirt 62. As seen in FIGS. 6 and 11, a lower portion of the stanchion rack 47 is provided with a slot 64 therethrough. A stanchion rack positioning pin 65 extends integrally between the two anchor plates through the slot 64 in the stanchion rack 47. A stanchion rack force bearing nut 68 is welded to the support skirt 62 and an opening is provided through the support skirt to allow introduction of a stanchion rack force bearing positioning bolt 70 threadably mounted in nut 68. In use, the bolt 70 is rotated with respect to the nut 68 and support skirt 62 to bring the stanchion rack into the desired relationship with respect to the pinion 43, the digging spoon 34 and digging spoon rack 45 when the lower end portion of the stanchion rack is held in contact with the end of bolt 70.

An outer end of a hook-shape stanchion rack locking bolt 72 extends into a vertical opening 74 provided in the lowermost end of the stanchion rack 47. This locking bolt 72 extends through a provided opening in the skirt 62, and a stanchion rack locking nut 75 is used to pull and hold the lower end portion of the stanchion rack 47 tightly against the end of the stanchion rack positioning bolt 70. By proper adjustment of these two locking and holding bolts, a very precise alignment of the stanchion rack with respect to the optimum path of the digging spoon and the digging spoon rack can be obtained.

To hold digging spoon drive pinion 43 in precise contact and alignment with the stanchion rack 47 throughout the travel of the pinion along that rack, the drive pinion support plates 39,39 of the digging spoon drive pinion support assembly 35 are each provided with a horizontally extending arm 76, and a digging spoon drive pinion support assembly positioning roller 78 is rotatably supported between those two pinion support plate arms 76 to roll on the smooth side of the stanchion rack 47 as perhaps best seen in FIGS. 6, 8 and 11.

The hydraulic linear piston-cylinder digging motors 38 are of the double acting type, and are provided with hydraulic hose connections 82 and 84 through which hydraulic fluid is provided from a source and through controls (not shown) in any usual or preferred manner.

In addition to the ring stand support arms 26,26, which are fixedly attached to the ring stand 22 at the fixed half 21 thereof, a pair of hydraulic linear piston-cylinder lift motors 86,86 are pivotally connected as at 88 to upper horizontal ring 54 and to tilt links 90,90 as at 92. These tilt links 90,90 are pivotally connected to the frame of the vehicle 30 at 94.

A pair of hydraulic linear piston-cylinder tilt motors 96,96 are pivoted to the vehicle chassis as at 98, and are pivoted to an intermediate portion of the tilt links 90,90 at 100.

A pair of hydraulic linear piston-cylinder ring stand opening motors 102,102 are pivotally connected at 104 to the fixed half 21 of the ring stand 22 and are pivotally connected at 106 and 106 to the openable quarters 23 and 25 of the ring stand 22.

The operation of the tree transplanting machine will be substantially the same as explained in my U.S. Pat. No. 4,031,637.

The embodiments of the invention in which an exclusive property or privilege is claimed are defined as follows:

1. In association with a machine for digging trees from the earth including:
   (a) a ring stand;
   (b) means for situating said stand in encircling relation to a tree to be transplanted;
   (c) a plurality of stanchions extending upwardly from said stand;
   (d) a plurality of digging spoons, each mounted for guided movement with respect to one of said stanchions and with respect to said stand between an upper position situated out of the earth is substantially parallel alignment with its stanchion, and a lower position wherein its lowermost portion meets with the lowermost portions of the other spoons when in said lower position;
   (e) guide means on each of said stanchions for guiding the path of each of said digging spoons as it moves between its upper and lower positions;
   (f) power digging means including a pinion for selectively moving each spoon between said upper and lower position, the improvement wherein said guide means includes:
      (1) a pair of digging spoon guide tracks adjustably mounted with respect to each stanchion and each extending outwardly therefrom in an opposite direction from the other to lie in a surface perpendicular to a plane normal to the axis of said pinion;
      (2) a pair of upper digging spoon guide wheels rotatably mounted on opposite upper edge portions of each of said digging spoons in position to encompass said guide tracks between outer edge portions of said digging spoons and said upper digging spoon guide wheels; and
      (3) a force bearing roller permanently but rotatably mounted with respect to the ring stand in position to contact an outside face portion of the digging spoon opposite the digging spoon rack and to limit and precisely determine the position of that portion of the digging spoon in contact with it whenever the spoon is moving up or down or is being lifted under a tree transplanting load.

2. In association with a machine for digging trees from the earth including:
   (a) a ring stand;
   (b) means for situating said stand in encircling relation to a tree to be transplanted;
   (c) a plurality of stanchions extending upwardly from said stand;
   (d) a plurality of digging spoons, each mounted for guided movement with respect to one of said stanchions and with respect to said stand between an upper position situated out of the earth in substantially parallel alignment with its stanchion, and a lower position wherein its lowermost portion meets with the lowermost portions of the other spoons when in said lower position;
   (e) guide means on each of said stanchions for guiding the path of each of said digging spoons as it moves between its upper and lower positions;
   (f) power digging means for selectively moving each spoon between said upper and lower position, the improvement wherein the power digging means includes:

(1) a pair of linear digging motors each having upper end portions thereof pivotally mounted to upper end portions of said stanchion;

(2) a rack integral with one of said digging spoons and extending in direction toward the center of the ring stand;

(3) a rack mounted on said stanchion in spaced, generally parallel relation to and facing toward the digging spoon rack;

(4) a pinion support assembly, (5) a pinion rotatably mounted in the pinion support assembly and situated in operating relationship to both of said racks;

(6) a pinion support assembly brace extending integrally outwardly from both sides of said pinion support assembly in direction parallel to and below the axis of said pinion; and (7) lower ends of both of said linear motors being operably fastened to opposite ends of said pinion support assembly support brace.

3. The structure of claim 1 wherein said guide means includes:

(8) a pair of digging spoon guide tracks adjustably mounted with respect to each stanchion and each extending outwardly therefrom in an opposite direction from the other to lie in a surface perpendicular to a plane normal to the axis of said pinion;

(9) a pair of upper digging spoon guide wheels rotatably mounted on opposite upper edge portions of each of said digging spoons in position to encompass said guide tracks between outer edge portions of said digging spoons and said upper digging spoon guide wheels;

(10) a force bearing roller permanently but rotatably mounted with respect to the ring stand in position to contact an outside face portion of the digging spoon opposite the digging spoon rack and to limit and precisely determine the position of that portion of the digging spoon in contact with it whenever the spoon is moving up or down or is being lifted under a tree transplanting load;

(11) means for fixedly positioning an upper end portion of said stanchion rack with respect to the stanchion; and

(12) means for adjustably mounting a lower end portion of said stanchion rack to provide for adjustment of said lower end portion toward and away from said digging spoon.

4. The structure of claim 1 wherein:

(8) said linear digging motors are constituted as double acting hydraulic piston-cylinder motors.

5. The structure of claim 1 wherein:

(8) said pinion includes a pair of parallel, spaced apart, generally circular end plates separated by a plurality of cylindrical teeth equally and symmetrically spaced around outer end portions of said end plates; and (9) wherein said racks include teeth separated by roots of shape to operably receive said cylindrical pinion teeth.

6. The structure of claim 1 wherein:

(8) said pinion support assembly includes a pair of horizontally extending roller support arms, each extending on an opposite side of the stanchion rack to position past that rack, and a pinion positioning roller rotatably mounted between said roller support arms in position to roll along the back side of said stanchion to hold the pinion firmly in precisely correct operational relationship with the stanchion rack during up and down movement of the pinion.

7. The structure of claim 3 wherein:

(13) said digging spoon guide tracks each include a guide track portion and a slotted fastening flange lying in a plane at right angles to said guide track portion; and

(14) said guide tracks are adjustably mounted to said stanchions through the instrumentality of bolts extending through said flange slots and into said stanchions.

8. The structure of claim 7 wherein:

(15) said means for adjustably mounting the lower end portion of the stanchion rack includes a stanchion rack positioning bolt longitudinally adjustably mounted with respect to the stanchion in alignment with and in bearing relation to said lower end portion of said stanchion rack to limit movement thereof in direction away from said digging spoon, and a stanchion rack locking bolt longitudinally adjustably mounted with respect to said stanchion in alignment with and so connected to said lower end portion of said stanchion rack as to limit movement thereof in direction toward said spoon.

9. The structure of claim 8 wherein:

(16) said lower end portion of said stanchion rack is provided with a transversely extending slot therethrough; and

(17) said stanchion rack lower end portion mounting means includes a stanchion rack positioning pin rigidly mounted with respect to said stanchion and extending through said slot in position to limit the maximum movement of the lower end portion of the stanchion rack in direction toward and away from the digging spoon and to resist forces on the rack tending to move it longitudinally during upward or downward spoon movement and tree transporting.

10. The structure of claim 9 wherein:

(18) said pinion support assembly includes a pair of horizontally extending roller support arms, each extending on an opposite side of the stanchion rack to position past that rack, and a pinion positioning roller rotatably mounted between said roller support arms in position to roll along the back side of said stanchion to hold the pinion firmly in precisely correct operational relationship with the stanchion rack during up and down movement of the pinion.

11. The structure of claim 5 wherein:

(10) said pinion support assembly includes a pair of horizontally extending roller support arms, each extending on an opposite side of the stanchion rack to position past that rack, and a pinion positioning roller rotatably mounted between said roller support arms in position to roll along the back side of said stanchion to hold the pinion firmly in precisely correct operational relationship with the stanchion rack during up and down movement of the pinion.

* * * * *

UNITED STATES PATENT OFFICE
CERTIFICATE OF CORRECTION

Patent No. 4,341,025         Dated  July 27, 1982

Inventor(s)  Walbert A. Stocker

It is certified that error appears in the above-identified patent and that said Letters Patent are hereby corrected as shown below:

Column 8, line 14, "is" should be --in--.

Column 9, line 21, Claim 3, "The structure of claim 1" should be --The structure of Claim 2--.

Column 9, line 49, Claim 4, "The structure of claim 1" should be --The structure of claim 2--.

Column 9, line 52, Claim 5, "The structure of claim 1" should be --The structure of claim 2--.

Column 9, line 61, Claim 6, "The structure of claim 1" should be --The structure of claim 2--.

Signed and Sealed this

Twenty-first Day of September 1982

[SEAL]

Attest:

Attesting Officer

GERALD J. MOSSINGHOFF

Commissioner of Patents and Trademarks